United States Patent
Mathew et al.

(10) Patent No.: US 11,900,163 B2
(45) Date of Patent: Feb. 13, 2024

(54) AUTONOMOUS MANAGEMENT OF COMPUTING SYSTEMS

(71) Applicant: Sedai Inc., Pleasanton, CA (US)

(72) Inventors: Suresh Mathew, San Ramon, CA (US); Nikhil Gopinath Kurup, Tampa, FL (US); Hari Chandrasekhar, Highlands Ranch, CO (US); Benjamin Thomas, San Jose, CA (US)

(73) Assignee: SEDAI, INC., Pleasanton, CA (US)

( * ) Notice: Subject to any disclaimer, the term of this patent is extended or adjusted under 35 U.S.C. 154(b) by 40 days.

(21) Appl. No.: 17/682,417

(22) Filed: Feb. 28, 2022

(65) Prior Publication Data

US 2022/0413983 A1    Dec. 29, 2022

Related U.S. Application Data

(60) Provisional application No. 63/214,783, filed on Jun. 25, 2021, provisional application No. 63/214,784, filed on Jun. 25, 2021.

(51) Int. Cl.

| | |
|---|---|
| *G06F 11/07* | (2006.01) |
| *G06F 9/50* | (2006.01) |
| *G06N 3/08* | (2023.01) |
| *G06F 8/71* | (2018.01) |
| *G08B 21/18* | (2006.01) |
| *H04L 43/16* | (2022.01) |
| *H04L 67/10* | (2022.01) |
| *H04L 67/00* | (2022.01) |

(Continued)

(52) U.S. Cl.
CPC ............. *G06F 9/5016* (2013.01); *G06F 8/71* (2013.01); *G06F 9/5094* (2013.01); *G06F 11/079* (2013.01); *G06F 11/0721* (2013.01); *G06F 11/0769* (2013.01); *G06F 11/3006* (2013.01); *G06F 11/34* (2013.01); *G06F 11/3452* (2013.01); *G06N 3/08* (2013.01); *G08B 21/182* (2013.01); *H04L 43/16* (2013.01); *H04L 67/10* (2013.01); *H04L 67/34* (2013.01); *G06F 2209/501* (2013.01)

(58) Field of Classification Search
CPC ... G06F 11/3006; G06F 11/34; G06F 11/3452
USPC ....................................................... 714/47.1
See application file for complete search history.

(56) References Cited

U.S. PATENT DOCUMENTS

| | | | | |
|---|---|---|---|---|
| 11,526,422 B2* | 12/2022 | Drori | ................. | G06F 11/3466 |
| 2017/0104658 A1* | 4/2017 | Sykes | ................. | H04L 41/044 |

(Continued)

*Primary Examiner* — Chae M Ko
(74) *Attorney, Agent, or Firm* — Anand P Narayan; Yantra Patents LLC

(57) ABSTRACT

Implementations described herein relate to methods, systems, and computer-readable media to monitor a distributed computing system. In some implementations, a method may include obtaining a first plurality of monitoring metrics of a respective application of one or more applications executing over the distributed computing system, obtaining time-series data of the first plurality of monitoring metrics, programmatically analyzing the time-series data of the first plurality of monitoring metrics to determine a second plurality of monitoring metrics, wherein the second plurality of monitoring metrics is determined to be a predictive set of the first plurality of monitoring metrics, and monitoring the distributed computing system by monitoring the second plurality of monitoring metrics.

20 Claims, 11 Drawing Sheets

(51) Int. Cl.
    *G06F 11/30*     (2006.01)
    *G06F 11/34*     (2006.01)

(56)         References Cited

U.S. PATENT DOCUMENTS

| | | | |
|---|---|---|---|
| 2017/0116621 A1* | 4/2017 | Gerard | G06Q 30/0202 |
| 2017/0206015 A1* | 7/2017 | Zhuang | G06F 3/0685 |
| 2020/0356459 A1* | 11/2020 | Harutyunyan | G06F 11/203 |
| 2021/0126839 A1* | 4/2021 | Rudrachar | H04L 43/0817 |
| 2021/0302946 A1* | 9/2021 | Potts | G06Q 10/063 |
| 2022/0237102 A1* | 7/2022 | Bugdayci | G06F 11/327 |
| 2023/0118854 A1* | 4/2023 | Katari | G06F 11/3457 |
| | | | 714/57 |

\* cited by examiner

AUTONOMOUS MANAGEMENT OF COMPUTING SYSTEMS

CROSS-REFERENCE TO RELATED APPLICATIONS

This application claims priority to U.S. Provisional Patent Application No. 63/214,783, filed 25 Jun. 2021, titled "AUTONOMOUS MANAGEMENT OF COMPUTING SYSTEMS" and to U.S. Provisional Patent Application No. 63/214,784, filed 25 Jun. 2021, titled "CLOUD MANAGEMENT SYSTEM WITH AUTONOMOUS ABERRANT BEHAVIOR DETECTION," which are incorporated by reference herein in their entirety.

TECHNICAL FIELD

Embodiments relate generally to autonomous performance monitoring of computing systems.

BACKGROUND

Enterprise computing systems commonly utilize distributed computing architectures, e.g., cloud-based systems to implement software applications. The applications may be hosted or executed across multiple computer systems that are operated by different service providers, and in many cases, using a variety of computer architectures.

Determining application performance and system performance commonly includes the monitoring of metrics that may be generated by a variety of computing systems, and in some cases, can include the monitoring of hundreds or even thousands of metrics.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes obtaining a first set of metrics to be monitored. The method also includes obtaining time-series data associated with the first set of metrics. The method also includes identifying one or more input metrics and one or more value metrics in the first set of metrics. The method also includes determining a second set of metrics that is a predictive set of the one or more value metrics, and where the second set of metrics has fewer elements that the first set of metrics. The method also includes monitoring the second set of metrics. Other embodiments of this aspect include corresponding computer systems, apparatus, and computer programs recorded on one or more computer storage devices, each configured to perform the actions of the methods.

Implementations may include one or more of the following features. The computer-implemented method may include providing the second set of metrics to a trained machine learning model. Determining the second set of metrics may include: identifying one or more value metrics in the first set of metrics; identifying one or more input metrics in the first set of metrics; determining that one or more secondary metrics in the first set of metrics are a predictive set of metrics for the one or more identified value metrics; and configuring the one or more secondary metrics as the second set of metrics. Implementations of the described techniques may include hardware, a method or process, or computer software on a computer-accessible medium.

One general aspect includes a computer-implemented method to monitor a distributed computing system. The computer-implemented method also includes obtaining a first plurality of monitoring metrics of a respective application of one or more applications implemented over the distributed computing system; obtaining time-series data of the first plurality of monitoring metrics; programmatically analyzing the time-series data of the first plurality of monitoring metrics to determine a second plurality of monitoring metrics, where the second plurality of monitoring metrics is determined to be a predictive set of the first plurality of monitoring metrics; and where a number of elements in the second plurality of monitoring metrics is smaller than a number of elements in the first plurality of monitoring metrics; and monitoring the distributed computing system by monitoring the second plurality of monitoring metrics. Other embodiments of this aspect include corresponding computer systems, apparatus, and computer programs recorded on one or more computer storage devices, each configured to perform the actions of the methods.

Implementations may include one or more of the following features. The computer-implemented method where the method further may include generating an alert based on the second plurality of monitoring metrics. Obtaining time-series data of the first plurality of monitoring metrics may include obtaining time series data for a plurality of time intervals. The plurality of time intervals includes time intervals of 2 days, 7 days, and 3 months. Programmatically analyzing the time-series data of the first plurality of monitoring metrics may include determining monitoring metrics that are substantially constant or substantially monotone. Programmatically analyzing the time-series data of the first plurality of monitoring metrics may include calculating a plurality of pairwise correlation coefficients based on the time-series data of the first plurality of monitoring metrics. The monitoring metrics include one or more of CPU utilization, latency, memory utilization, disk I/O for an application. The monitoring metrics include one or more of input metrics, secondary metrics, and value metrics. Implementations of the described techniques may include hardware, a method or process, or computer software on a computer-accessible medium.

One general aspect includes a non-transitory computer-readable medium. The non-transitory computer-readable medium also includes obtaining a first plurality of monitoring metrics of a respective application of one or more applications implemented over a distributed computing system; obtaining time-series data of the first plurality of monitoring metrics; programmatically analyzing the time-series data of the first plurality of monitoring metrics to determine a second plurality of monitoring metrics, where the second plurality of monitoring metrics is determined to be a predictive set of the first plurality of monitoring metrics; and where a number of elements in the second plurality of monitoring metrics is smaller than a number of elements in the first plurality of monitoring metrics; and monitoring the distributed computing system by monitoring the second plurality of monitoring metrics. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the operations further may include generating an alert based on the second plurality of monitoring metrics. Obtaining time-series data of the first plurality of monitoring metrics may include obtaining time series data for a plurality of time intervals. The plurality of time intervals includes time intervals of 2 days, 7 days, and 3 months. Programmatically analyzing the time-series data of the first plurality of monitoring metrics may include determining monitoring metrics that are substantially constant or substantially monotone. Programmatically analyzing the time-series data of the first plurality of monitoring metrics may include calculating a plurality of pairwise correlation coefficients based on the time-series data of the first plurality of monitoring metrics. Programmatically analyzing the time-series data of the first plurality of monitoring metrics further may include applying a normalization to the time-series data of at least one monitoring metric of the first plurality of monitoring metrics. The monitoring metrics include one or more of CPU utilization, latency, memory utilization, disk I/O for an application. The monitoring metrics include one or more of input metrics, secondary metrics, and value metrics. Implementations of the described techniques may include hardware, a method or process, or computer software on a computer-accessible medium.

DETAILED DESCRIPTION

Figure 1:
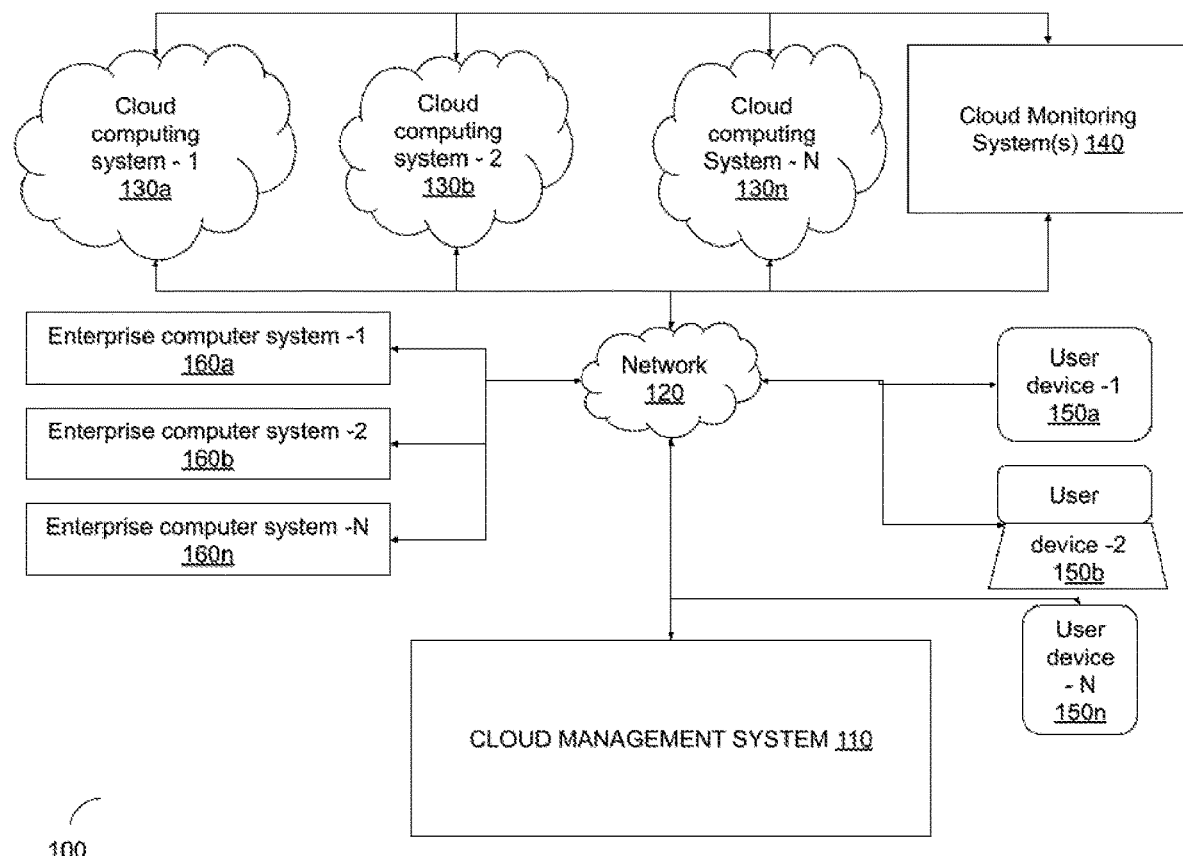
FIG. 1 is a diagram of an example distributed computing environment, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

Today's extremely competitive global market calls for a high degree of business agility and responsiveness to customer needs and tastes. The introduction rate of new features via software releases has steadily increased to meet ever-evolving customer needs, and innovative computing architectures such as cloud native microservice architectures are becoming the new norm. Releases have risen to hundreds per month with a consequent impact on the roles and responsibilities of Site Reliability Engineers (SRE) who are tasked with managing the computing environment.

Technical outages to computing systems can have significant business implications. For example, Costco warehouse, with over 98.6 million members, had one of its biggest outages on Thanksgiving Day in 2019, impacting close to 2.6 million of its customers and causing more than $11 million in losses. On the same day, Home Depot, H&M, and Nordstrom customers too reported issues with their e-commerce sites. According to the Information Technology Industry Council (ITIC), 86% of the companies estimate that an hour of downtime can cause a greater than $300,000 revenue loss, and for 34% of companies, anywhere from $1 to $5 million.

It was reported that for Black Friday shoppers specifically, nearly half of consumers (49%) say they will abandon their cart if they receive any error message during checkout that prevents them from completing their purchase. Shoppers who have to wait six seconds are 50% less likely to make a purchase, and 33% of shoppers will visit a competitor if the site they are currently on is slow to load.

For more critical services like health care, the stakes are much higher. Dexcom, a leader in continuous glucose monitoring systems, had a service outage for more than 24 hours, which resulted in irate customers and lives at risk.

With businesses increasingly earning larger revenue shares from online commerce, CTOs and SRE organizations are under tremendous pressure to achieve high levels of site availability at the most optimal costs—all while satisfying ever-increasing regulatory pressures.

In the pre-DevOps/Cloud era, monolithic services designed site architectures for product and software releases once or twice a year. However, businesses' modern needs now dictate faster responses to market signals. With the advent of cloud technology and simultaneous services segmentation, product features can be released quicker than ever—sometimes more than 50 times per year. But alongside an increased churn rate for features and versions comes elevated management costs.

Cloud adoption, virtualization, and DevOps maturity have led to agile deployment strategies and reduced time to market (TTM), which allows businesses to compete more effectively. Automation played a vital role on the road to achieving agile deployment—processes transitioned from being imperatively managed by a set of system administrators with command line interface, to being declaratively managed by a much smaller team of administrators in a distributed framework.

Organizations commonly utilize multiple cloud providers to implement their computing solutions. For example, an organization may utilize offerings from one or more providers, e.g., Amazon Web Services (AWS), Google Cloud Platform (GCP), Microsoft Azure etc., to implement their solution architecture. Metrics associated with their solution architecture and applications running over their architecture may be provided by multiple monitoring providers.

A typical software product implemented via a microservices based architecture may include hundreds of underlying applications. For example, a money transfer application may include multiple microservices operating using a combination of parallel and sequential processes, e.g., a client login microservice, a pre-validation check microservice, a microservice that performs funds availability verification, a risk analysis microservice to investigate fraud or other unauthorized transaction, etc.

Each microservice may be executed by a different code set, implemented and managed by different teams, with their own development cycles, releases, etc. Each of the microservices may utilize its own metric or set of metrics to monitor performance and health of the microservice and/or application.

During run-time, issues and problems may occur at any of multiple levels, e.g., runtime errors or performance issues caused by code issues due to a new release, integration issues of a particular microservice with other microservices, integration issues with third party providers, network issues, hardware issues, etc.

One approach is to monitor what is referred to as the golden metrics; latency, traffic, errors, and saturation. However, just monitoring the golden metrics across hundreds, or even thousands of applications in a typical enterprise environment can be a challenging task. At an enterprise scale, manual tracking through visualization type tools are usually not feasible, and detection of abnormal application behavior is often way too late.

Due to a large number of applications and infrastructure options available, a technical problem is the identification and monitoring of the most effective metric(s) to enable early detection of impending issues.

Many applications performance management (APM) solutions and monitoring solutions produce reports and/or data streams that include the provision of hundreds of metrics out of the box. Despite commonalities in the nature of applications associated with a software product or service, each application can have its own unique set of metrics that can provide valuable leads that are indicative of one or more issues. Monitoring all of these metrics can be cost prohibitive, and in some cases, be computationally expensive (or even impossible within real-time limitations). Besides, a large number of monitoring metrics can add noise and be destructive to SREs.

While some monitoring applications provide for adding rule-based alarms for different metrics, even this approach would require the SREs to first identify the metrics and specify suitable threshold values to create the rule-based alarms. To further compound the problem, fast paced application development and deployment environments can cause the ideal metrics, set of metrics, and threshold values to change over time.

While the golden metrics described earlier can provide a good indication of the application behavior, there may be other monitoring metrics that provide early indications of problems before they are indicated by the golden metrics.

Techniques of this disclosure can be utilized for automatic identification of an optimal set of monitoring metrics out of all the available monitoring metrics for each application. The optimal set may be augmented by customer specified monitoring metrics. Per techniques of this disclosure, samples of available metrics are obtained for each application. Machine learning (ML) techniques and statistical techniques are applied to the obtained samples to determine the early indicators of problems (and associated monitoring metrics) that are observed in applications, e.g., problems observed based on generated errors, tickets, or the golden metrics being outside acceptable thresholds.

Methods of this disclosure enable early problem identification of problems and can reduce monitoring calls (e.g., API calls) to providers, thereby offering additional savings in computational and/or network overhead, besides reducing costs. Received data may be utilized to fine tune a ML and/or statistical model over time. Adaptive algorithms may be utilized to continuously train the ML model and adapt to the changing nature of the application(s).

The described techniques provide a single, consistent interface that enables an SRE or other administrator to manage their enterprise and cloud system(s). Further, such management is independent of the type of deployments, and may be applied to applications that are implemented across different regions and across different infrastructure providers. The techniques simplify cloud management automation by automatically enabling monitoring of key metrics as they relate to system and application performance.

FIG. 1 is a diagram of an example distributed computing environment, in accordance with some implementations. FIG. 1 illustrates an example system environment 100, in accordance with some implementations of the disclosure and illustrates a block diagram of an environment 100 wherein a cloud management service might be used. FIG. 1 and the other figures utilize similar (like) reference numerals to identify like elements. A letter after a reference numeral, such as "130," indicates that the text refers specifically to the element having that particular reference numeral. A reference numeral in the text without a following letter, such as "130," refers to any or all of the elements in the figures bearing that reference numeral (e.g., "130" in the text refers to reference numerals "130*a*," "130*b*," and/or "130*n*" in the figures).

The system environment 100 includes a cloud management system 110, which may include a variety of computer subsystems. Each of the subsystems can include a set of networked computers and devices. User system 110 can also include other subsystems not depicted, as they may pertain to the cloud management system.

The cloud management system is utilized to manage one or more distributed computing systems that are associated with one or more enterprise computer systems 160*a*, 160*b*, and 160*n* that utilize one or more cloud computing systems offered by respective infrastructure providers, 130*a*, 130*b*, and 130*n* that are connected via network 120.

Environment 100 may also include user devices 150*a*, 250*b*, and 150*n* that are utilized by users to access and/or execute one or more applications on the cloud computing systems. The cloud management system 110 itself may be implemented as a cloud-based system that is supplied and hosted by one or more third-party providers, and is accessible to users, e.g. system administrators and/or system reliability engineers (SREs), etc., via a variety of connected devices.

User devices 150 and enterprise computer system 160 may include any machine, system, or set of machines, systems that are used by an enterprise and users. For example, any of user devices 150 can include handheld computing devices, mobile devices, servers, cloud computing devices, laptop computers, workstations, and/or a network of computing devices. As illustrated in FIG. 1, user devices 150 might interact via a network 120 with a cloud computing system 130 that provides a service.

Cloud computing systems 130, cloud management system 110, and enterprise computer system 160 may utilize captive storage and/or cloud-based storage. In some implementations, on-demand database services may be utilized. The data store may include information from one or more tenants stored into tables of a common database image to form a multi-tenant database system (MTS). A database image may include multiple database objects. A relational database management system (RDMS) or the equivalent may execute storage and retrieval of information against the database object(s).

Access to cloud management system 110, enterprise computer systems 160, cloud monitoring system 140, and cloud computing system 130 may be controlled by permissions (permission levels) assigned to respective users. For example, when an employee or contractor associated with a cloud management system 110 is interacting with enterprise computer system 160, cloud monitoring system 140, user device(s) of the employee or contractor is provided access on the basis of permissions associated with that employee or contractor. However, an administrator associated with cloud management system 110 may be provided additional access privileges based on access privileges allotted to that administrator. In user systems with a hierarchical organization level, users at a certain permission level may have access to applications, data, and database information accessible to a lower permission level user, but may not be provided access to certain applications, database information, and data accessible to a user at a higher permission level. Thus, users can have different capabilities with regard to accessing and modifying application and database information, depending on a user's security or permission level.

Network 120 is any network or combination of networks of computing devices that enable devices to communicate with one another. For example, network 120 can be any one or any combination of a LAN (local area network), WAN (wide area network), telephone network, wireless network, point-to-point network, star network, token ring network, hub network, or other appropriate configuration.

The computer systems may be connected using TCP/IP and use other common Internet protocols to communicate, such as HTTP, FTP, AFS, WAP, etc. Users may access the systems by utilizing different platforms and frameworks, e.g., by using single-page client applications that use HTML and TypeScript.

An application execution environment as described herein can be any software environment that supports execution of a software application. For example, an application execution environment supported herein may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based on Linux CGroups, Docker, Kubernetes, CoreOS, etc.), a process executing under an operating system (e.g., a UNIX process), etc. In some implementations, the application execution environment may be a software application, e.g., that is configured to execute on server hardware.

Techniques of this disclosure can be applied to a wide variety of deployment types, e.g., to distributed computing systems that utilize stateless containers, stateful containers, serverless deployments, etc.

Figure 2:
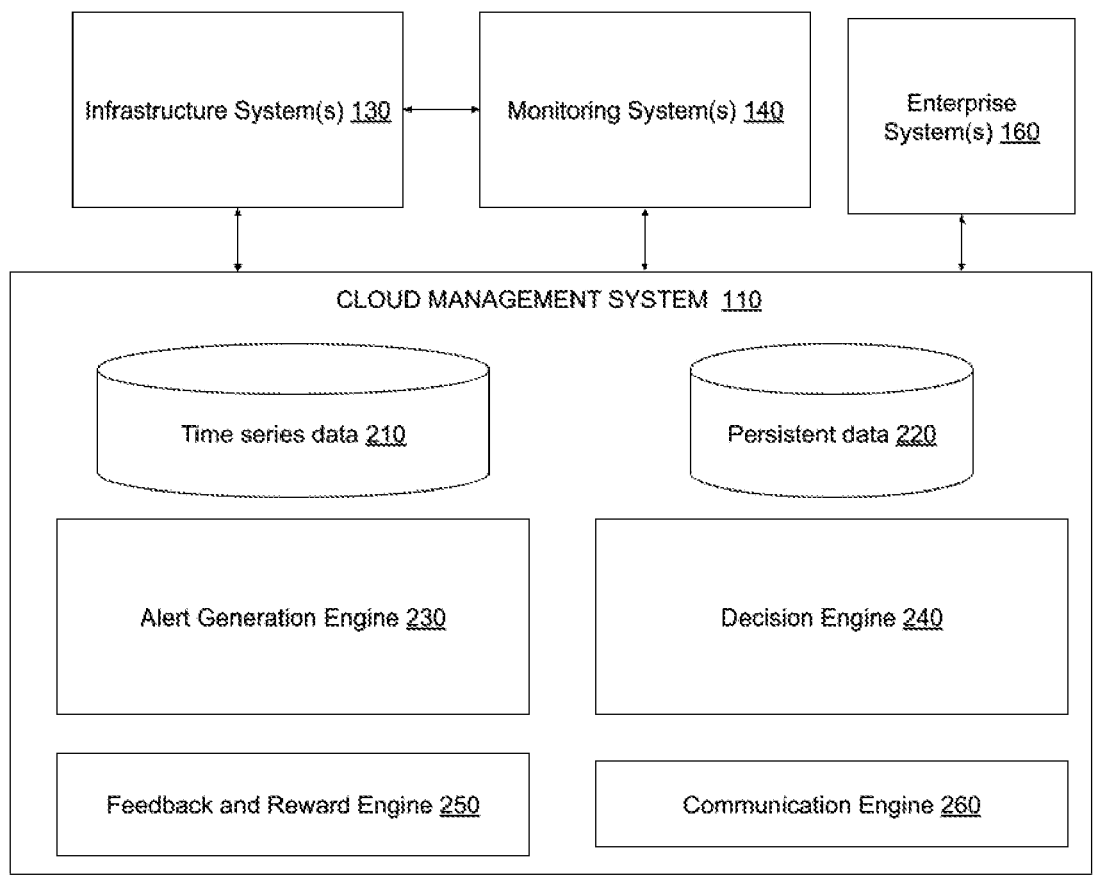
FIG. 2 illustrates a cloud management system, in accordance with some implementations.

FIG. 2 illustrates a cloud management system, in accordance with some implementations.

Cloud management system 110 may include subsystems configured for different functionality. In some implementations, cloud management system 110 may include an alert generation engine 230, a decision engine (core engine) 240, a feedback and reward engine 250, and a communication engine 260. Cloud management system 110 may also include one or more databases (datastores), for example, a time series database 210, and a persistent database 220.

In some implementations, databases 210 and 220 may be configured as external databases and/or cloud-based data storage that is accessible to the cloud management system. In some implementations, the cloud management system 110 is communicatively coupled to one or more infrastructure systems 130, monitoring system(s) 140, and enterprise system(s) 160.

In some implementations, the cloud management system is configured to receive monitoring metrics associated with applications implemented on and/or executing on one or more infrastructure systems (cloud computing systems). The monitoring metrics may be received directly from the infrastructure systems and/or monitoring system(s) associated with respective infrastructure systems.

Figure 3:
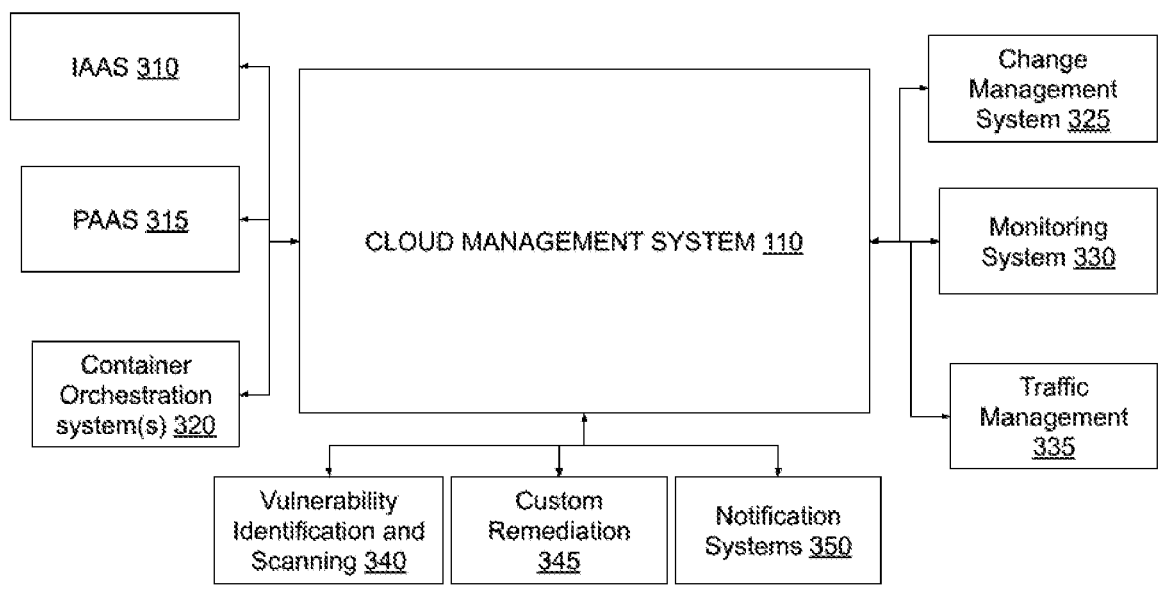
FIG. 3 is a diagram that depicts an example of a cloud management system and example interacting systems, in accordance with some implementations.

FIG. 3 is a diagram that depicts an example of a cloud management system and interacting computing systems, in accordance with some implementations.

As depicted in FIG. 3, the cloud management system is configured to interact with multiple systems for various purposes. For example, the cloud management system may be coupled to Infrastructure as a service (IAAS) systems 310 that enable an enterprise to lease or rent servers for compute and storage resources. The cloud management system may be coupled to IAAS systems located in different geographical locations.

In some implementations, the cloud management system may be coupled to Platform as a service (PAAS) systems 315 that enable enterprises to lease servers as well as receive access to other development and deployment resources, e.g., middleware, development tools, database management systems, business analytics services, etc.; to Container Orchestration systems 320 that enable automation of containerized workloads, e.g., Kubernetes, Docker Swarm, Apache Mesos, etc.

In some implementations, the cloud management system may be coupled to one or more Change Management System(s) 325 that enable enterprises to manage change and release processes and to meet their auditing and compliance requirements; to one or more monitoring systems 330; and to Traffic Management System(s) 335 that are utilized to manage cloud traffic at various layers.

In some implementations, the cloud management system may be coupled to a vulnerability identification and scanning system 340, e.g., which may operate upon alerts received from the cloud management system to detect security issues, flaws and/or attacks.

In some implementations, the cloud management system may be coupled to a Custom Remediation System 345, operable to perform custom remediations based on detected anomalies.

One or more notification systems 350, e.g., Slack, pager systems, email systems, etc. may be coupled to the cloud management system for the transmission of alerts, messages, and notifications to users.

Figure 4A:
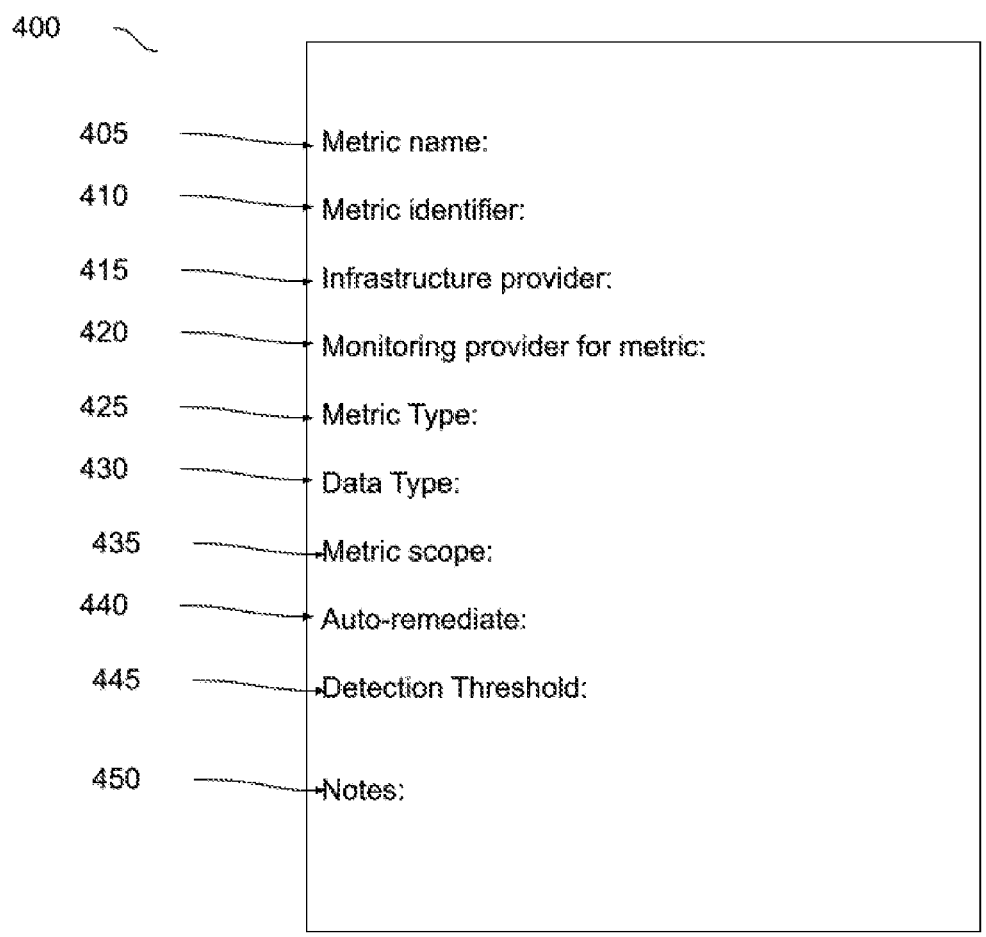
FIG. 4A depicts an example metric in a distributed (cloud) computing environment, in accordance with some implementations.

FIG. 4A depicts an example monitoring metric and associated attributes in a distributed (cloud) computing environment, in accordance with some implementations.

As described earlier, the cloud management system may receive and/or obtain one or more monitoring metrics from a cloud computing system and/or monitoring system associated with one or more applications that are being monitored and managed.

In some implementations, the monitoring metrics may be automatically received by the cloud management system. In some other implementations, the monitoring metrics may be obtained by querying a database, e.g., Prometheus, etc. at periodic intervals.

In this illustrative example, an example monitoring metric record is depicted, with associated attributes, metric name 405, a metric identifier 410, an originating infrastructure provider (cloud computing provider) identifier 415, a monitoring metric provider 420, a metric type 425, a data type 430 associated with the monitoring metric, metric scope 435, an auto remediate field 440 that indicates whether auto remediation should be performed based on the particular metric, a detection threshold 445 for any anomaly detection, and notes 450 associated with a metric.

The list of attributes for the example metric provided above is provided as an example, and is not exhaustive, and specific implementations may utilize additional monitoring metrics for each application being managed/monitored, and some implementations may omit some of the attributes altogether.

Monitoring metrics and their attributes may be specified by a user, e.g., a user or administrator associated with an enterprise system, monitoring system, or cloud computing system provider, or be automatically inferred by the cloud management system.

A suitable user interface may be utilized to enable users to define/specify monitoring metrics and associated attributes. Menu options, e.g., pull-down menu options, etc., may be provided to enable easy user selection of monitoring metric and associated attributes. For example, a metric type attribute for a monitoring metric may be specified to be one of a volume, saturation, latency, error, ticket; a data type for a monitoring metric may be specified to be one of a number, a percentage, or a counter; a metric scope for a monitoring metric may be specified to be one of site wide, application specific, load balancer, or instance.

In some implementations, the attributes may be specified by tags that are associated with the monitoring metric and provided by the cloud computing system or the monitoring system that is generating and providing the metrics.

In some implementations, metric attributes may be specified by a provider of the metric, along with metadata associated with the corresponding metric. For example, a provider may specify whether a metric is provided at an aggregate level or at an instance level.

In some implementations, metric attributes are automatically inferred by the cloud management system. In some implementations, metric attributes may be specified by a user, e.g., an administrator or SRE associated with a computer system.

Figure 4B:
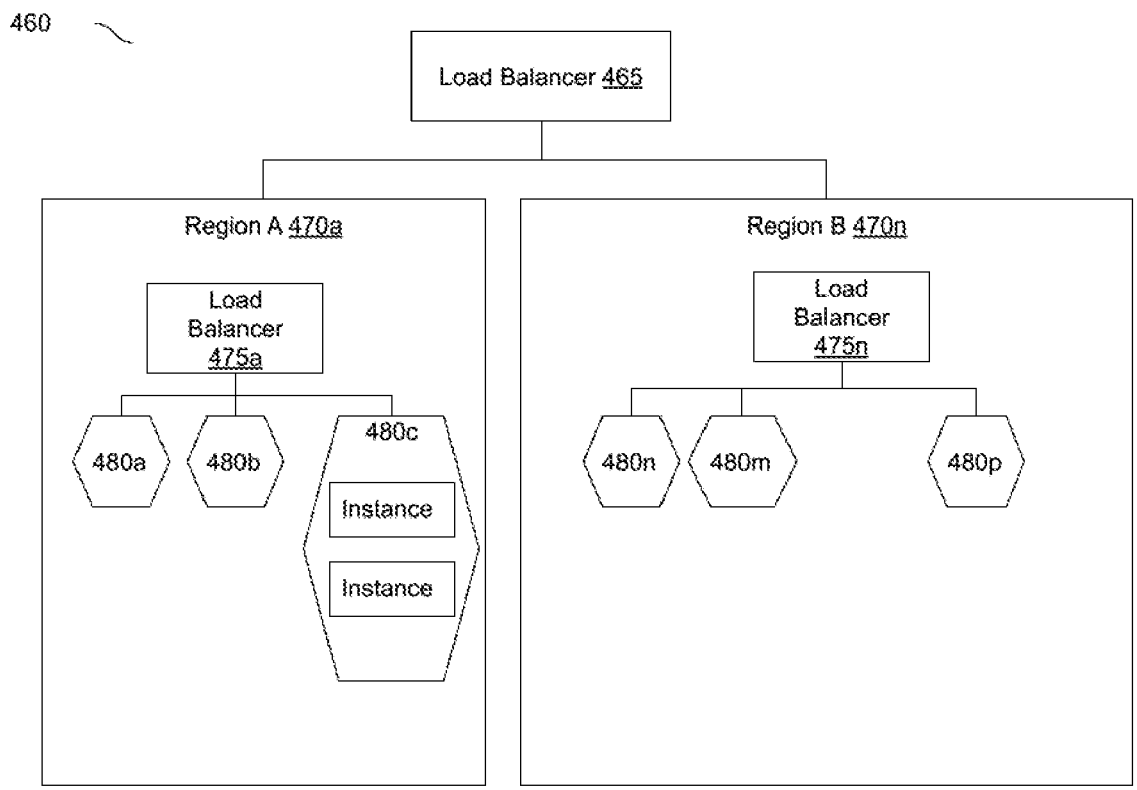
FIG. 4B depicts an example topology within a distributed (cloud) computing environment, in accordance with some implementations.

FIG. 4B depicts an example topology within a distributed (cloud) computing environment, in accordance with some implementations.

Distributed computing environments are commonly distributed over geographical regions to serve a diverse set of users, with dedicated computing resources earmarked for processing applications associated with a particular region. Within each region, one or more cloud computing systems may be utilized to serve and process applications. Load balancers at a global or regional level are utilized to distribute the computing load evenly across available computing resources.

In this illustrative example, an example topology 460 of the computing environment is depicted in FIG. 4B. A load balancer 465 at the global level is utilized to receive requests, e.g., http requests, etc., from users and distribute it to regional computing clusters 470a or 470n.

Within each region, a load balancer may be utilized to distribute computing tasks to available resources. For example, load balancer 475a may be utilized in region 470a, and load balancer 475n may be utilized in region B.

Based on the type of requests, the load balancers may distribute tasks to available virtual machines within the cluster. Specialized management tools and software may be available and utilized for the distribution of tasks to resources.

In some implementations, a virtual machine may be utilized for only one type of application, whereas in other implementations, a virtual machine may be utilized for multiple types of applications, and even multiple applications from multiple client users.

Specific infrastructure providers may utilize different techniques and tools to track assignment of computing tasks to resources. For example, in some implementations, a load balancer may maintain a list of currently executing tasks, and alternately, a history or log of tasks processed as well.

In some other implementations, e.g., containerized systems, a state of a cluster of compute resources may be represented as objects that describe what containerized applications are running on which nodes, resources allocated to those applications, and any associated policies.

Figure 5:
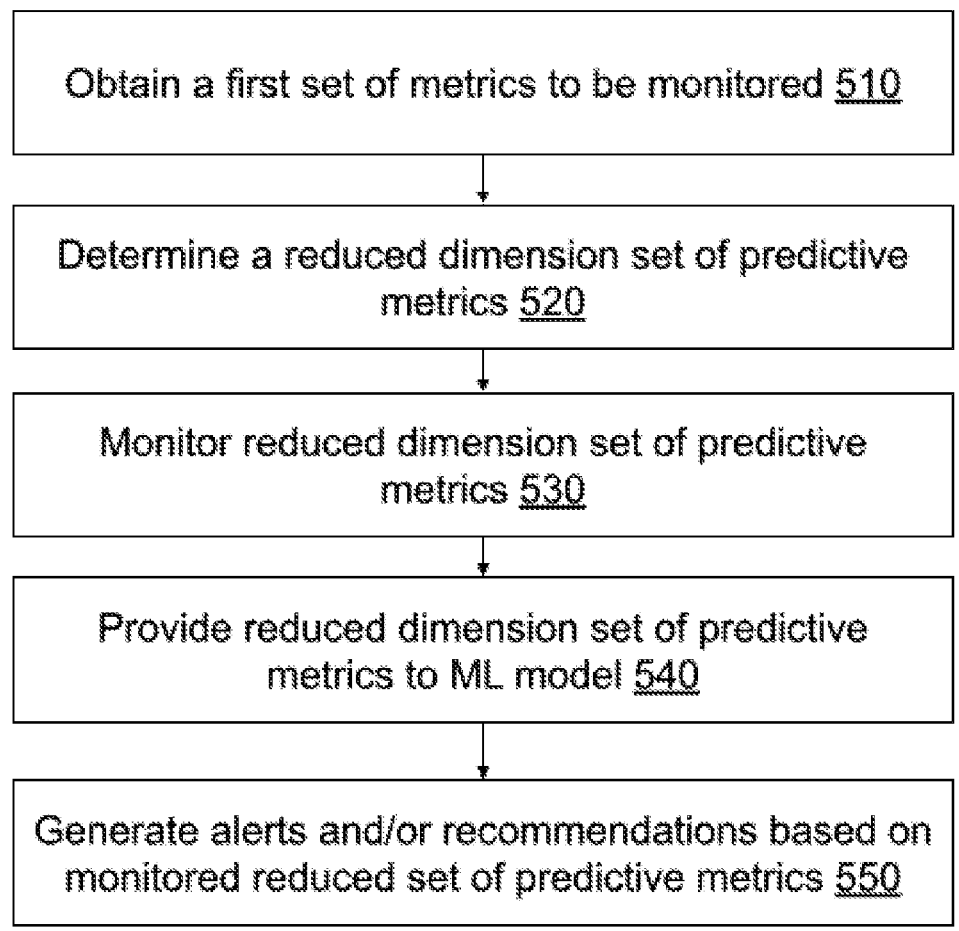
FIG. 5 is a flowchart illustrating an example method to determine a reduced dimension set of metrics to be monitored, in accordance with some implementations.

FIG. 5 is a flowchart illustrating an example method to determine a reduced dimension set of metrics to be monitored, in accordance with some implementations.

Metrics are monitored to determine a current state of a computing environment, its health, and various parameters are monitored to ensure that it is running smoothly and as planned.

Processing may begin at block 510.

At block 510, a first set of metrics to be monitored is obtained.

Block 510 may be followed by block 520.

At block 520, a reduced dimension set of predicted metrics is determined.

Block 520 may be followed by block 530.

At block 530, the reduced dimension set of predicted metrics is monitored.

Block 530 may be followed by block 540.

At block 540, the reduced dimension set of predictive metrics is provided to a trained machine learning (ML) model.

Block 540 may be followed by block 550.

At block 550, alerts and/or recommendations may be generated based on the monitored reduced dimension set of predictive metrics.

Figure 6:
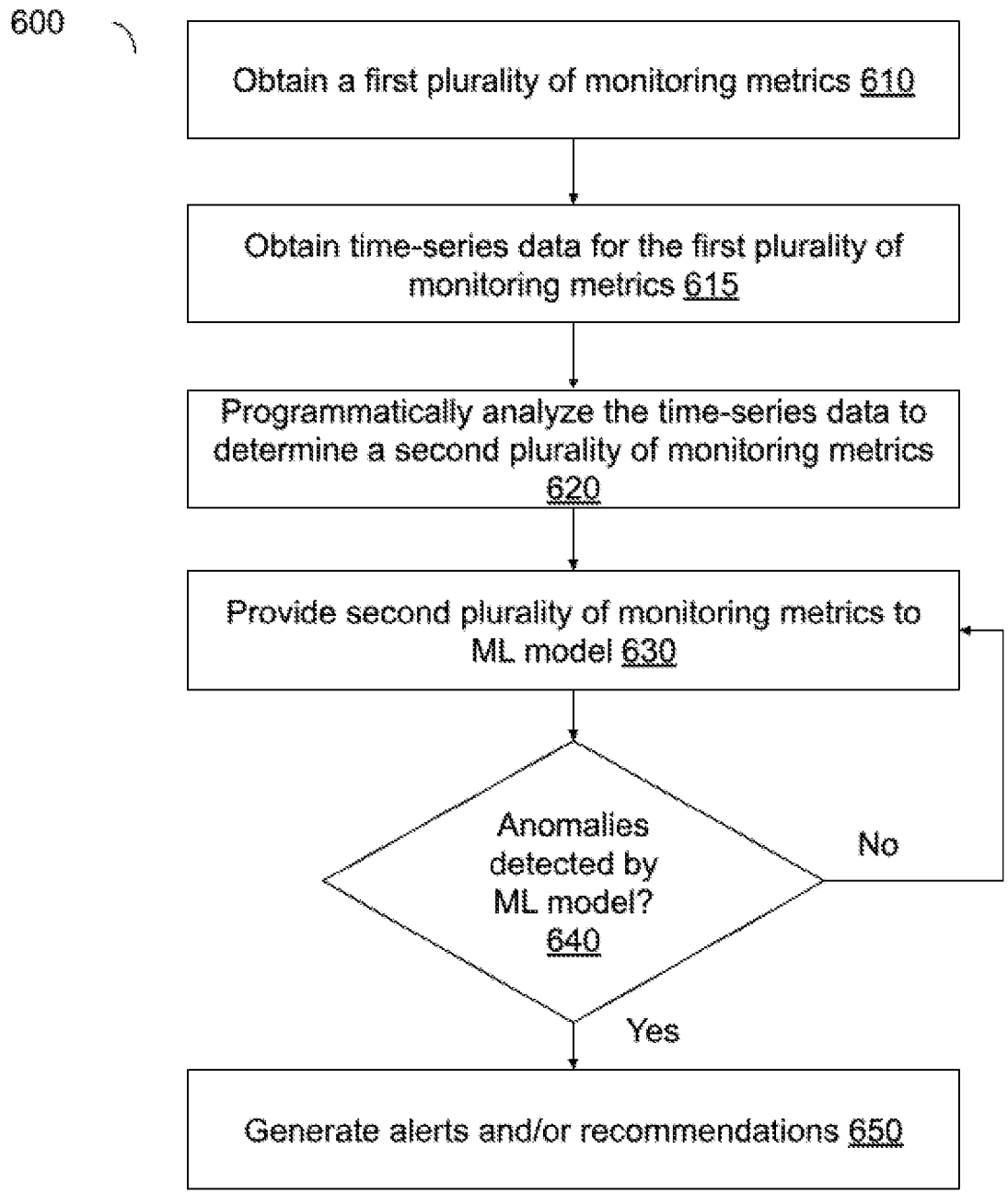
FIG. 6 is a flowchart illustrating an example method to monitor a set of metrics in a cloud computing environment, in accordance with some implementations.

FIG. 6 is a flowchart illustrating an example method 600 to monitor a set of metrics in a cloud computing environment, in accordance with some implementations.

In some implementations, method 600 can be implemented, for example, by cloud management system 110 described with reference to FIG. 1. In some implementations, some or all of the method 600 can be implemented on one or more systems as shown in FIG. 1, on and/or on a combination of user systems and processing systems. In the described examples, the implementing system includes one or more digital processors or processing circuitry ("processors"), and one or more storage devices (e.g., storage device 210, 220, or other storage devices). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices, distributed devices or instances, or server devices) that can send results or data to the first device.

In some implementations, the method 600, or portions of the method, can be initiated automatically by a system. In some implementations, the implementing system is a first device. For example, the method (or portions thereof) can be periodically performed, or performed based on one or more particular events or conditions, e.g., reception of a fresh batch of monitoring metrics, based upon a user request, at a predetermined time, a predetermined time period having expired since the last performance of method 600, and/or one or more other conditions occurring which can be specified in settings read by the method.

Processing may begin at block 610. At block 610, a first plurality of monitoring metrics is obtained. The plurality of monitoring metrics may be associated with a single application, a group of applications associated with a particular client, or a group of applications associated with and/or executing on a particular computing environment. Each of the plurality of monitoring metrics may have an associated list (set) of attributes, e.g., similar to list 400 described with reference to FIG. 4A.

In some implementations, the first plurality of monitoring metrics may be specified by client. In some other implementations, credentials for a particular infrastructure provider and/or monitoring provider are obtained, and the plurality of metrics may include all metrics that are generated for the set of applications associated with a client. In some implementations, a list of available monitoring metrics as well as a set of key (critical) metrics may be obtained, e.g., from an enterprise client.

In some implementations, configuration information, credentials, etc., are stored in a persistent database, e.g., data store 220 described with reference to FIG. 2. In some implementations, a list of monitoring metrics may be obtained from cloud computing providers, whereas, in some other implementations, a list of monitoring metrics may be obtained from monitoring providers. In some implementations, the monitoring metrics may be obtained from a combination of cloud computing providers and monitoring providers. In some implementations, a list of monitoring metrics may be a human curated list of monitoring metrics.

The monitoring metrics may include error data, entries within log files, and any other information associated with parameters and metrics that are indicative of system performance and health as well as application performance and health.

The monitoring metrics can include metrics from multiple applications, and from multiple parts of an integrated software chain. Different components in the application stack may provide their own monitoring metrics. For example, application level metrics may be obtained that are associated with a particular application; monitoring metrics may be obtained from one or more load balancers that manage computing resources and may include metrics such as a number of connections, and metadata associated with each connection; an infrastructure provider, e.g., AWS, may provide monitoring metrics such as instance identifier(s), CPU usage per minute for each instance, and input/output (I/O) bytes associated with each instance, etc.

Example metrics may include CPU utilization, latency, memory utilization, Disk Input/Output (I/O) for an application at an application and/or an instance level. Some monitoring metrics may be metrics associated with user experience, that may be obtained or inferred based on actual user experience with an application.

Block 610 may be followed by block 615.

At block 615, time-series data of the first plurality of monitoring metrics are obtained.

The monitoring metrics may be received from different cloud providers and/or monitoring providers. In some implementations, received monitoring metrics may be normalized to a single format (standard), which may be applied across all providers to enable comparison and combination of monitoring metrics received from different sources.

In some implementations, the monitoring metrics are received as time-series data associated with a particular time period (interval). In some implementations, additional normalization operations may be performed such that the time-series data of different monitoring metrics are synchronous and refer to the same time period.

In some implementations, the time-series data is obtained by querying a database where the time-series data is stored, e.g., an external data source at a cloud computing system or a cloud monitoring provider or third-party provider. In some implementations, the time-series data may be obtained by querying a time-series database, e.g., database 210 described with reference to FIG. 2. In some implementations, the time-series data may be obtained from a monitoring solution and time series database, e.g., Victoria Metrics, Prometheus, etc. In some implementations, the time-series data may be obtained via a pull model wherein an initial request for data may originate from the cloud management system, which is then responded to by the database server.

The time series data may be obtained for multiple time intervals, e.g., time intervals of 2 days, 7 days, 3 months, 6 months, etc. In some implementations, different time intervals may be utilized for different applications and/or infrastructure providers.

In some implementations, normalization of the obtained monitoring metrics may be performed, e.g., if received from different sources that have different scales, units, etc. In some implementations, a topology of the distributed computing system may be inferred periodically, e.g., every 20 minutes, every 30 minutes, etc.

Block 615 may be followed by block 620.

At block 620, the time-series data of the first plurality of monitoring metrics is programmatically analyzed to determine a second plurality of monitoring metrics, wherein the second plurality of monitoring metrics is determined to be a predictive set of the first plurality of monitoring metrics. The second plurality of monitoring metrics is a reduced dimension set when compared to the first plurality of monitoring metrics, e.g., a number of elements in the second plurality of monitoring metrics is smaller than a number of elements in the first plurality of monitoring metrics.

In some implementations, the second plurality of monitoring metrics for an application may include a least number of metrics selected from the first plurality of monitoring metrics that may reliably predict the performance of the application.

In some implementations, a first category of the monitoring metrics in the first plurality of monitoring metrics may be determined, e.g., whether the particular monitoring metric is one of volume metric, an availability metric, a latency metric, an error metric, a ticket metric, etc.

In some implementations, a second category of the monitoring metrics in the first plurality of monitoring metrics may be determined, e.g., whether the particular monitoring metric is an input metric, a secondary metric, or a primary metric. In some implementations, monitoring metrics in each respective category may be ranked, and a subset of the monitoring metrics in each category (first category and/or second category) may be selected for inclusion in the second plurality of monitoring metrics.

In some implementations, the category determination may be performed based on time-series data associated with a first time interval, e.g., data over 2 days, whereas the remainder of the programmatic analysis may be performed based on time-series data associated with additional time intervals, e.g., 2 days, 1 week, 2 months, 6 months, etc.

For example, it may be determined that the first plurality of monitoring metrics includes one or more monitoring metrics that are input (e.g., traffic-dependent) metrics, e.g., incoming traffic, number of messages received, number of files imported, size of files imported, etc., and thus are externally driven metrics. Such metrics may not be responsive to any cloud management, but are largely dependent on season, user behavior, and other external factors. In some implementations, a current value of an input metric may also be utilized to determine a predicted value of one or more other metrics and a state of one or more applications.

In some implementations, input metrics may be determined based on metadata associated with the metrics. In some other implementations, metrics that do not correlate with any other metrics may be determined to be input metrics. In some implementations, metrics that correlate with traffic dependent parameters may be determined to be input metrics. It may also be determined that the first plurality of monitoring metrics includes one or more monitoring metrics that are value (primary) metrics, e.g., key metrics that in turn are related to user experience, uptime, etc. In some implementations, one or more value metrics may be specified by a user, e.g., an administrator of an enterprise or cloud computing system, e.g., periodically, or at a time of intake and initiation of cloud management by a cloud management provider.

In some implementations, one or more value (primary) metrics may be identified based on historical system behavior. For example, one or more primary metrics may be identified based on correlation of ranges of values for the metric with historical events, e.g., errors observed, tickets generated, system downtime, system shutdown, etc.

In some implementations, the time-series data of the monitoring metrics in the first plurality of monitoring metrics may be programmatically analyzed and ranked based on a degree of predictability of one or more value metrics based on the corresponding monitoring metric. In some implementations, a predetermined number of monitoring metrics may be automatically selected to determine a second plurality of monitoring metrics based on their ranking.

In some implementations, programmatically analyzing the time-series data may include determining monitoring metrics that may be substantially constant, substantially monotone, and/or substantially null. Such monitoring metrics may be automatically excluded from consideration for inclusion in the second plurality of monitoring metrics.

In some implementations, programmatically analyzing the time-series data may include determining monitoring metrics that are strongly correlated with one or more other monitoring metrics and may be ranked based on their predictive ability. Only one monitoring metric of such a group of strongly correlated monitoring metrics may be considered and selected for inclusion in the second plurality of monitoring metrics.

For example, a threshold correlation coefficient, e.g., 0.75 may be specified as an indicator of predictive ability. In an illustrative example, three different monitoring metrics may have correlation coefficients that meet (e.g., are greater than) the threshold correlation coefficient for a metric of interest. In such a scenario, if the three different monitoring metrics are strongly correlated with one another, only the strongest predictor may be utilized for the second plurality of monitoring metrics. This may enable the utilization of fewer computational sources as well as reduce computational time and/or complexity.

Figure 7:
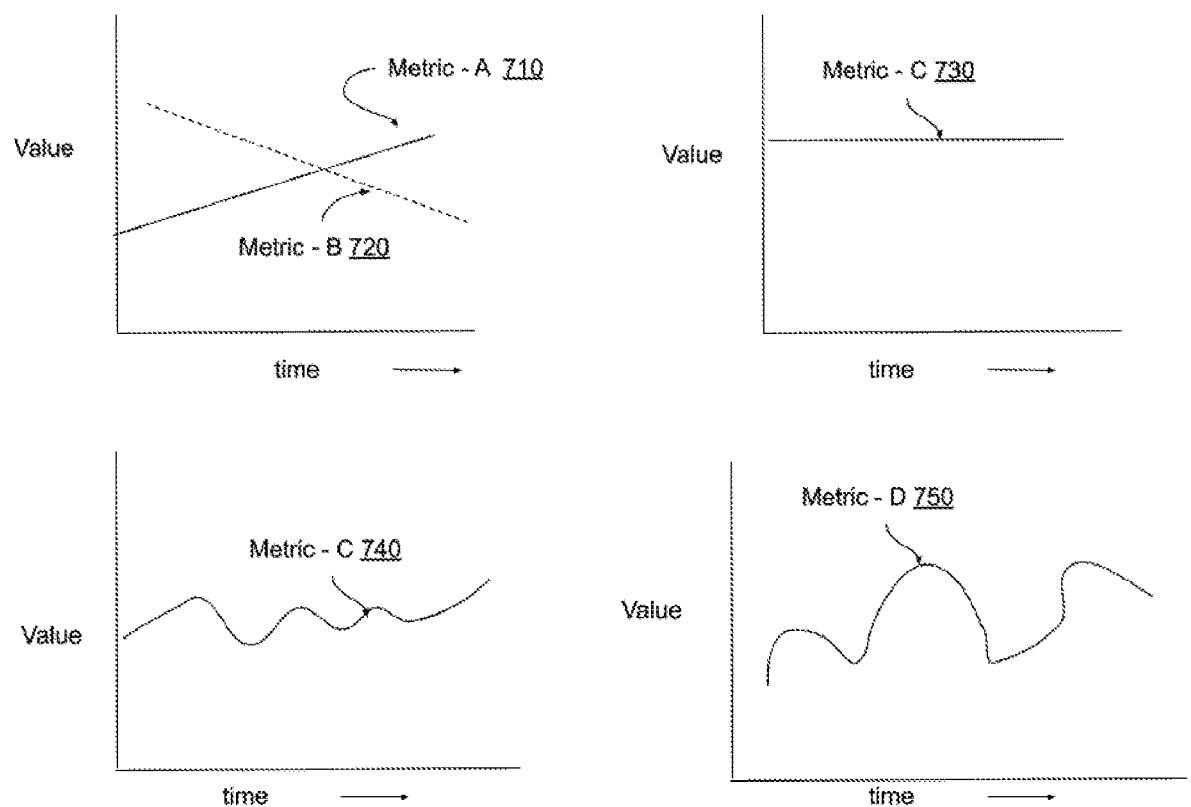
FIG. 7 depicts example time-series data of monitoring metrics, in accordance with some implementations.

FIG. 7 depicts example time-series data of monitoring metrics, in accordance with some implementations.

As an example, the first plurality of monitoring metrics may include a monitoring metric, Metric-A 710 that serves as a counter (e.g., counting incrementally upwards), and thus exhibits a monotone behavior that is non decreasing. Similarly, Metric-B 720 may exhibit a monotone non increasing behavior.

The first plurality of monitoring metrics may include monitoring metrics whose time-series data are constant or substantially constant, e.g., Metric C 730.

The first plurality of monitoring metrics may include monitoring metrics whose time-series data may follow other distributions, e.g., stationary or non-stationary distributions, e.g., Metric-C 740, and Metric-D 750.

Per techniques of this disclosure, mathematical and/or statistical properties of each of the monitoring metrics included in the first plurality of monitoring metrics are determined. In some implementations, the mathematical and/or statistical properties are determined for multiple time-intervals of interest, for example, over 1 day, 2 days, 3 days, 7, days, 1 month, 6 months, etc. In some implementations, the mathematical and/or statistical properties are determined separately for multiple regions of interest, e.g., geographical regions, etc. Determination of the mathematical and/or statistical properties over multiple time periods (intervals) may enable determination of trends such as seasonality, e.g., diurnal variations, regional variations, variations due to weekend/weekday, variations due to holidays and seasons, etc.

Based on the determined mathematical and/or statistical properties of each the monitoring metrics in the first plurality of monitoring metrics, a second plurality of monitoring metrics is determined that is a reduced dimension set of monitoring metrics and which is determined to be a reliable predictor of a current and/or future performance of the distributed computing system and/or applications associated with the distributed computing system.

In some implementations, a subset of monitoring metrics in the first plurality of monitoring metrics may be sequentially eliminated from consideration for a reduced dimension set of monitoring metrics based on their mathematical and/or statistical properties. For example, monitoring metrics that exhibit substantially monotone or substantially constant behavior may be eliminated at a first stage.

In some implementations, transformation of metrics may be performed. This may be performed to normalize (transform) a distribution of metric values for a particular metric to certain mathematical distributions, e.g., normal distributions, Poisson distributions, etc.

For example, a time-series of a metric may be transformed to its first differential, a logarithm applied to the metric, etc. This may have the effect of converting metric values with no discernable pattern to a distribution that may be well characterized, and amenable to mathematical and/or statistical analysis.

In some implementations, statistical tests may be applied to the time-series data for each metric to identify a suitable normalization, which may then be performed.

In some implementations, pairs of monitoring metrics from the first plurality of monitoring metrics may be selected, and pairwise correlation coefficient(s) may be computed for the corresponding time-series data. This may be repeated across all possible pairs of monitoring metrics included in the first plurality of monitoring metrics.

The correlation coefficient(s) for pairs of monitoring metrics may be determined for multiple time-intervals, as well as for lagged versions of the time series data relative to one another. For example, for a given pair of monitoring metrics, a set of correlation coefficients may be determined for the synchronous time-series data for each monitoring metric in the pair, as well as pairwise correlation coefficients wherein the time series data for one of the monitoring metrics is time-shifted relative to the other. In some implementations, the correlation coefficient(s) may be utilized to determine which of the monitoring metrics are independent, e.g., input variables, which of the monitoring metrics are correlated variables, and which of the monitoring metrics may be leading indicators of other correlated variables.

In particular, it may be beneficial to determine which of the monitoring metrics are secondary variables that are leading indicators of value metrics, e.g., monitoring metrics that are particularly important to the performance and/or health of applications and the distributed computing system(s).

In some implementations, programmatically analyzing the time-series data may include providing the time-series data to a trained machine learning model. A portion of the time-series data may be utilized to train the machine learning model. In some implementations, ground truth labels corresponding to periods of confirmed anomalies may be utilized to apply supervised machine learning techniques.

The machine learning model may be utilized to predict a value of a monitoring metric, e.g., a value metric, based on a value of a secondary metric at a previous point in time. An error computed between the predicted value of the metric and its actual value may be utilized to update parameters of the machine learning model. The training process may be continued until the prediction error meets a predetermined threshold. In some implementations, time-series prediction techniques such as SMA, ARIMA, LTSM, Kalman filter, etc., may be utilized to predict the time-series data.

Figure 8:
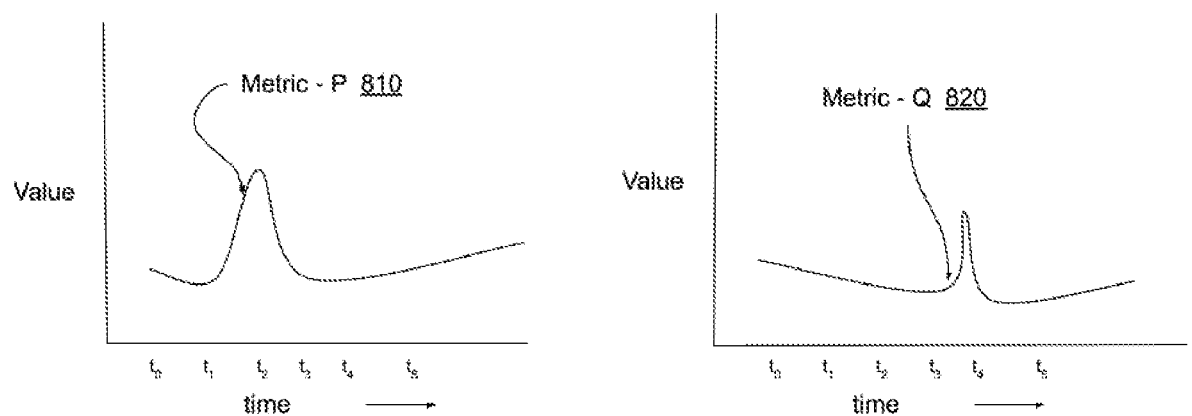
FIG. 8 depicts an example of a pair of correlated monitoring metrics, in accordance with some implementations.

FIG. 8 depicts an example of a pair of correlated monitoring metrics, in accordance with some implementations.

In this illustrative example, time-series data of two example monitoring metrics, Metric-P 810, and Metric-Q 820 are depicted. As can be seen from FIG. 8, Metric-Q appears to have characteristics similar to Metric-P, but with a time lag. For example, the time-series data of Metric-P indicates a decreasing trend between times $t_0$ and $t_1$, which is observed between times to and $t_3$ for Metric-Q. A sharp spike is observed between time $t_1$ and $t_3$ in Metric-P, while a spike is observed between times $t_3$ and $t_4$ for Metric-Q. An increasing trend in the time-series data between times $t_3$ and $t_5$ is also observed for Metric-Q between times $t_4$ and $t_5$. It will be appreciated that while the behavior of the two example monitoring metrics is qualitatively described here with respect to FIG. 8, the actual determination of Metric-P being a predictive metric of Metric-Q is made via calculating corresponding correlation coefficients for the pairs of time-series data at different (time) lags of one series with respect to the other.

Based on correlation coefficient(s) computed for this pair of monitoring metrics, and on the time lagged version, it may be determined, in this example, that Metric-P may be a leading indicator of Metric-Q. Monitoring of Metric-P may therefore provide early feedback about possible issues that may appear subsequently in Metric-Q.

In some implementations, one or more thresholds may be utilized to determine a degree of correlation between monitoring metrics, and only such monitoring metrics that meet a threshold degree of correlation may be considered for a reduced dimension set and a second plurality of monitoring metrics.

In some implementations, a degree of early indication may be utilized for selection of monitoring metrics for the second plurality of monitoring metrics. For example, if it is determined that there are two monitoring metrics that are both estimated to be reliable leading indicators of a particular value metric, a monitoring metric that is consistently an earlier predictor of the particular value metric may be selected for consideration for inclusion in the second plurality of monitoring metrics.

In some implementations, multivariate correlation of three or more monitoring metrics may be utilized to determine the second plurality of monitoring metrics.

In some implementations, it may be determined that a subset of monitoring metrics selected from the first plurality of monitoring metrics represents a complete set of leading (predictive) metrics, and such a complete set may be specified as the second plurality of monitoring metrics.

In some implementations, the second plurality of monitoring metrics includes a smallest set of metrics that is a reliable and/or efficient predictor of the primary metrics for the application.

In some implementations, one or more metrics may be selected for the second plurality (reduced dimension set) of monitoring metrics that offers (meets) a threshold performance (predetermined or specified threshold performance) using the smallest quantity of data. In some implementations, one or more metrics may be selected for the second plurality (reduced dimension set) of monitoring metrics that offers a threshold performance for the smallest (or shortest) computational cost. In some implementations, one or more metrics may be selected for the second plurality (reduced dimension set) of monitoring metrics that offers a threshold performance at the earliest time, e.g., a highest lead time before an event of interest.

In some implementations, additional calculations may be performed to determine a nature of correlation, e.g., causality relationships between respective monitoring metrics, during the pairwise comparison of monitoring metrics.

In some implementations, first or higher differences between respective time-series data may be calculated prior to calculation of the correlation coefficients. In some implementations, information criteria such as the Akaike information criterion or the Schwarz information criterion may be utilized to determine a number of lags to be utilized in the determination of the correlation between any two (or more) monitoring metrics.

In some implementations, users are provided with an option to include monitoring metrics in the second plurality of monitoring metrics. This may be provided to accommodate special insights that SREs or other users may have into the computing environment. In such implementations, user provided monitoring metrics are included in the second plurality of monitoring metrics even if they are not determined based on techniques and methods described herein for the automatic determination of monitoring metrics.

Block 620 may be followed by block 630.

At block 630, the second plurality of monitoring metrics is provided to a trained machine learning (ML) model for anomaly detection and continued monitoring of the distributed computing system by monitoring the second plurality of monitored metrics.

Block 630 may be followed by block 640.

At block 640, it is determined whether any anomalies are detected by the ML model. If anomalies are detected, block 640 may be followed by block 650, else block 640 may be followed by block 630.

At block 650, an alert or recommendation may be generated based on the second plurality of monitoring metrics. In some implementations, an alert or recommendation may also be followed by auto remediation. In some implementations, periodic reports may be generated based on the second plurality of monitoring metrics.

Blocks 610-650 can be performed (or repeated) in a different order than described above and/or one or more steps can be omitted. For example, in some implementations, block 650 may be omitted, and in some implementations, blocks 610-620 may be performed at a different, e.g., at a lower frequency than blocks 630-650. In some implementations, a human curated list of monitoring metrics may be obtained, and the method may begin at block 615. Blocks 610-650 may be repeated with continuous refinements. For example, current or recently available data may be utilized to refine specific metrics in the second plurality of monitoring metrics, etc.

Figure 9:
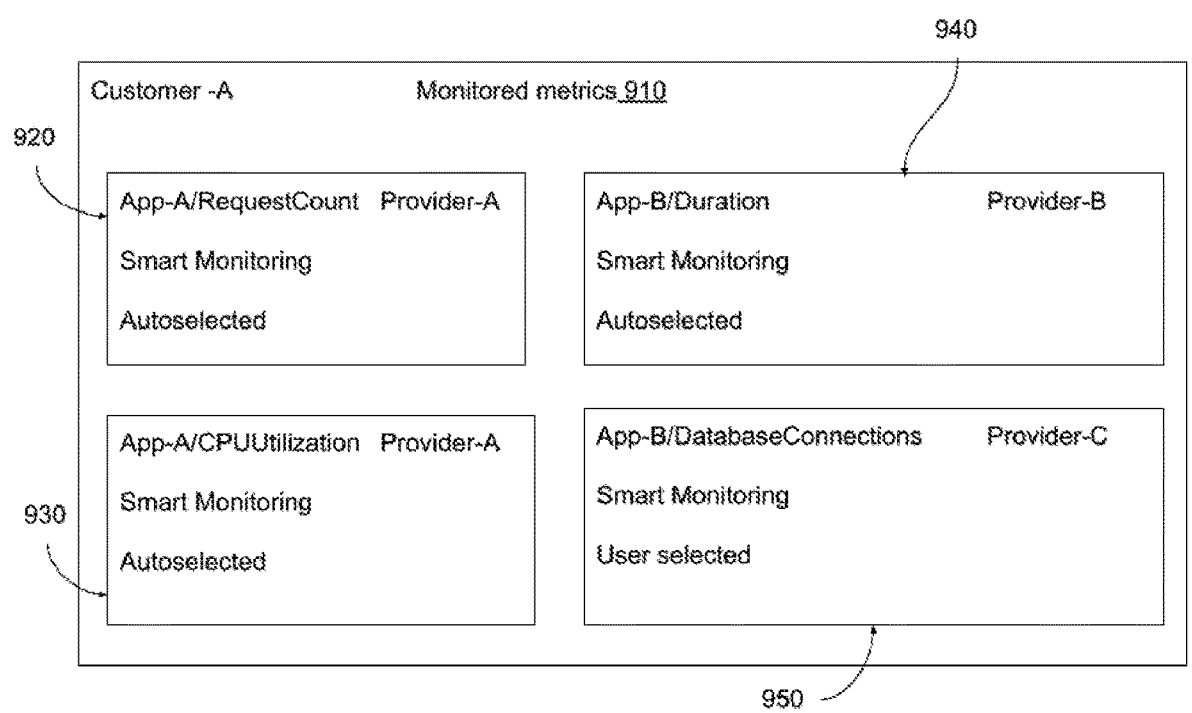
FIG. 9 is a screenshot that depicts an example of monitoring of a distributed computing system, in accordance with some implementations.

FIG. 9 is a screenshot that depicts an example dashboard for monitoring metrics of a distributed computing system, in accordance with some implementations.

As depicted in the example dashboard, a user interface may be utilized to display a set of monitored metrics for a given enterprise customer. In some implementations, the displayed monitoring metrics may include all the monitoring metrics being currently monitored for the customer, whereas in other implementations, the display may only include application-level monitoring metrics.

The monitoring metrics display may include aggregated data over multiple infrastructure providers and/or monitoring providers and thus provides a convenient, single display with information relevant to the SRE and enables a quick picture of health of the system and applications. A single interface view may be provided that provides information about monitoring metrics from multiple sources without requiring the users to navigate across separate views and providing a holistic view of infrastructure and application health, including from multiple monitoring providers.

In some implementations, different screens may be utilized to display a full set of monitoring metrics as well as a reduced dimension set, for example, as described with reference to FIG. 5 and FIG. 6.

Cards may be utilized to provide additional information about each selected metric. For example cards 920, 930, 940, and 950 provide key details of each monitored metric in the set, e.g. source of metric, infrastructure provider, application for which the metric is being generated, and also whether the monitoring metric as automatically selected, e.g., using a method described in FIG. 6, or whether it was user selected, e.g., entered as a metric to be monitored by an SRE, administrator, other user, etc.

In some implementations, a user may be provider with an option to obtain additional information about a monitored metric, e.g., by a mouseover or via a user hover over a card. Additional information may be provided such as one or more golden metrics that are related to a particular metric, and which may be a basis for selection of this metric. Additional statistical information may also be provided via the user interface.

Figure 10:
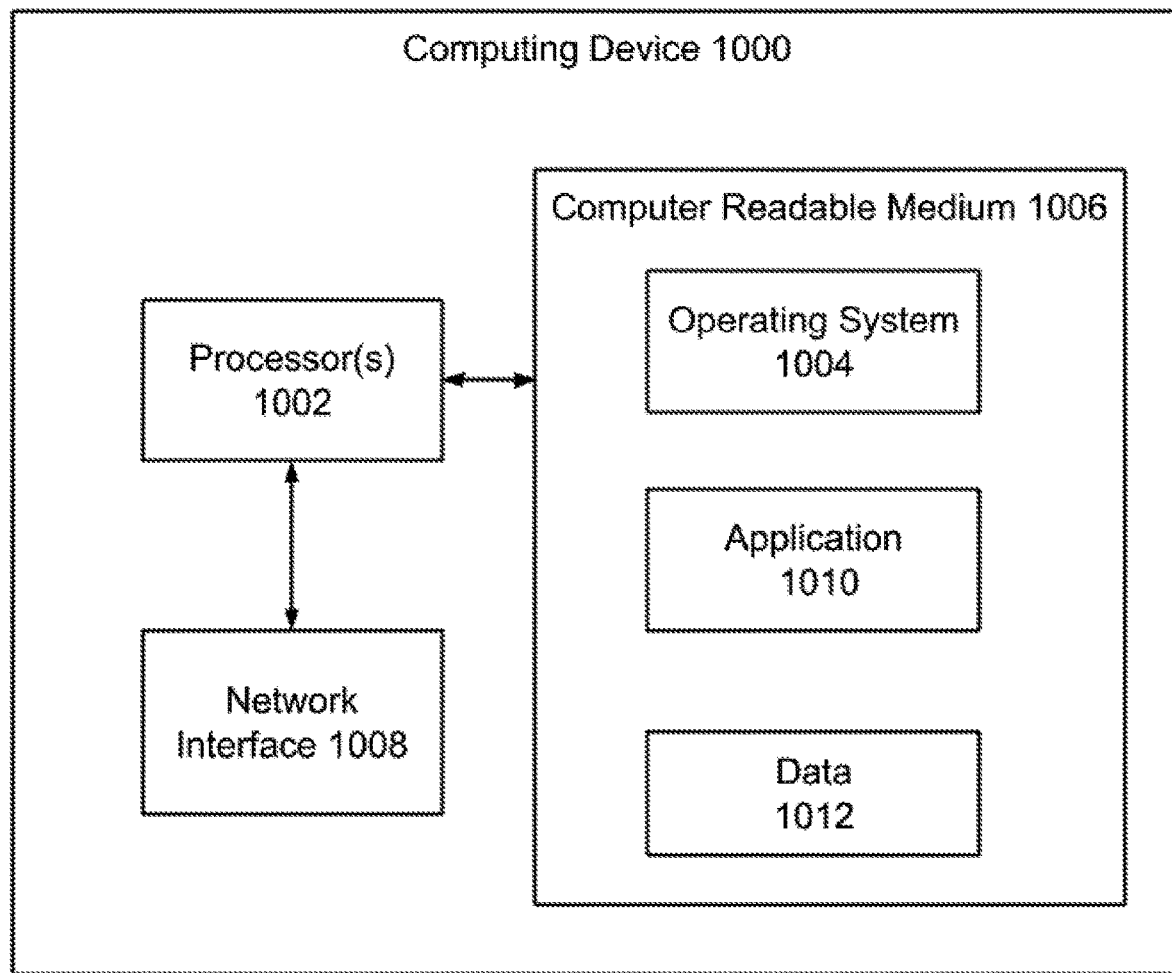
FIG. 10 is a block diagram illustrating an example computing device, in accordance with some implementations.

FIG. 10 is a block diagram of an example computing device 1000 which may be used to implement one or more features described herein. In one example, device 1000 may be used to implement a computer device (e.g., a device utilized in 110, 130, 140, 150, and/or 160 of FIG. 1), and perform appropriate method implementations described herein. Computing device 1000 can be any suitable computer system, server, or other electronic or hardware device. For example, the computing device 1000 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1000 includes a processor 1002, a memory 1006, and an input/output (I/O) interface 1008.

Processor 1002 can be one or more processors and/or processing circuits to execute program code and control basic operations of the device 1000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1006 is typically provided in device 1000 for access by the processor 1002 and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1002 and/or integrated therewith. Memory 1004 can store software operating on the server device 1000 by the processor 1002, including an operating system 1004, one or more applications 1010 and application data 1012. In some implementations, application 1010 can include instructions that enable processor 1002 to perform the functions (or control the functions of) described herein, e.g., some or all of the methods described with respect to FIGS. 5 and 6.

Elements of software in memory 1006 can alternatively be stored on any other suitable storage location or computer-readable medium. In addition, memory 1006 (and/or other connected storage device(s)) can store instructions and data used in the features described herein. Memory 1006 and any other type of storage (magnetic disk, optical disk, magnetic tape, or other tangible media) can be considered "storage" or "storage devices."

An I/O interface can provide functions to enable interfacing the server device 1000 with other systems and devices. For example, network communication devices, storage devices (e.g., memory and/or data store 120), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 10 shows one block for each of processor 1002, memory 1006. These blocks may represent one or more processors or processing circuitries, operating systems, memories, I/O interfaces, applications, and/or software engines. In other implementations, device 1000 may not have all of the components shown and/or may have other elements including other types of elements instead of, or in addition to, those shown herein. While the processing system 110 is described as performing operations as described in some implementations herein, any suitable component or combination of components of processing system 110 or similar system, or any suitable processor or processors associated with such a system, may perform the operations described.

A user device can also implement and/or be used with features described herein. Example user devices can be computer devices including some similar components as the device 1000, e.g., processor(s) 1002, memory 1006, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1000 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500 and 600) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. The non-transitory computer-readable medium can include instructions, that responsive to execution by a processor or processing device, can cause the processor to processing device to perform operations, e.g., operations described in one or more of methods 500 and 600. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
   obtaining a first set of metrics to be monitored, wherein the first set of monitoring metrics includes an application level metric and an instance level metric associated with a respective software application executing over a distributed computing system;
   obtaining time-series data associated with the first set of metrics;

identifying one or more input metrics and one or more value metrics in the first set of metrics;

determining a second set of metrics that is a predictive set of the one or more value metrics, and where the second set of metrics has fewer elements than the first set of metrics, and wherein the second set of metrics is a subset of monitoring metrics selected from the first set of monitoring metrics;

monitoring the second set of metrics; and performing an auto-remediation of the respective software application based on the monitoring of the second set of metrics.

2. The computer-implemented method of claim 1, further comprising providing the second set of metrics to a trained machine learning model.

3. The computer-implemented method of claim 1, wherein determining the second set of metrics comprises:

identifying one or more value metrics in the first set of metrics;

identifying one or more input metrics in the first set of metrics;

determining that one or more secondary metrics in the first set of metrics are a predictive set of metrics for the one or more identified value metrics; and configuring the one or more secondary metrics as the second set of metrics.

4. A computer-implemented method to monitor a distributed computing system, wherein the method comprises:

obtaining a first plurality of monitoring metrics of a respective software application of one or more software applications implemented over the distributed computing system, wherein the first plurality of monitoring metrics includes an application level metric and an instance level metric associated with the respective software application;

obtaining time-series data of the first plurality of monitoring metrics;

programmatically analyzing the time-series data of the first plurality of monitoring metrics to determine a second plurality of monitoring metrics, wherein the second plurality of monitoring metrics is a subset of monitoring metrics selected from the first plurality of monitoring metrics, wherein the second plurality of monitoring metrics is determined to be a predictive set of the first plurality of monitoring metrics; and wherein a number of elements in the second plurality of monitoring metrics is smaller than a number of elements in the first plurality of monitoring metrics;

monitoring the distributed computing system by monitoring the second plurality of monitoring metrics; and performing an auto-remediation of the respective software application based on the monitoring of the second plurality of monitoring metrics.

5. The computer-implemented method of claim 4, wherein the method further comprises generating an alert based on the second plurality of monitoring metrics.

6. The computer-implemented method of claim 4, wherein obtaining time-series data of the first plurality of monitoring metrics comprises obtaining time series data for a plurality of time intervals.

7. The computer-implemented method of claim 6, wherein the plurality of time intervals includes time intervals of 2 days, 7 days, and 3 months.

8. The computer-implemented method of claim 4, wherein programmatically analyzing the time-series data of the first plurality of monitoring metrics comprises determining monitoring metrics that are substantially constant or substantially monotone, and wherein determining that the second plurality of monitoring metrics is a predictive set comprises at least excluding the monitoring metrics that are substantially constant or substantially monotone from the second plurality of monitoring metrics.

9. The computer-implemented method of claim 4, wherein programmatically analyzing the time-series data of the first plurality of monitoring metrics comprises calculating a plurality of pairwise correlation coefficients based on the time-series data of the first plurality of monitoring metrics, wherein determining that the second plurality of monitoring metrics is a predictive set comprises at least determining that a first pairwise correlation coefficient and a second pairwise correlation coefficient meet a threshold correlation coefficient, and wherein determining that the second plurality of monitoring metrics comprises at least excluding a monitoring metric that is associated with a lesser of the first pairwise correlation coefficient and the second pairwise correlation coefficient.

10. The computer-implemented method of claim 4, wherein the monitoring metrics include one or more of CPU utilization, latency, memory utilization, Disk I/O for an application.

11. The computer-implemented method of claim 4, wherein the monitoring metrics include one or more of input metrics, secondary metrics, and value metrics.

12. A non-transitory computer-readable medium comprising instructions that, responsive to execution by a processing device, causes the processing device to perform operations comprising:

obtaining a first plurality of monitoring metrics of a respective application of one or more applications implemented over a distributed computing system, wherein the first plurality of monitoring metrics includes an application level metric and an instance level metric associated with the respective application;

obtaining time-series data of the first plurality of monitoring metrics;

programmatically analyzing the time-series data of the first plurality of monitoring metrics to determine a second plurality of monitoring metrics, wherein the second plurality of monitoring metrics is a subset of monitoring metrics selected from the first plurality of monitoring metrics, wherein the second plurality of monitoring metrics is determined to be a predictive set of the first plurality of monitoring metrics; and wherein a number of elements in the second plurality of monitoring metrics is smaller than a number of elements in the first plurality of monitoring metrics;

monitoring the distributed computing system by monitoring the second plurality of monitoring metrics; and performing an auto-remediation of the respective application based on the monitoring of the second plurality of monitoring metrics.

13. The non-transitory computer-readable medium of claim 12, wherein the operations further comprise generating an alert based on the second plurality of monitoring metrics.

14. The non-transitory computer-readable medium of claim 12, wherein obtaining time-series data of the first plurality of monitoring metrics comprises obtaining time series data for a plurality of time intervals.

15. The non-transitory computer-readable medium of claim 14, wherein the plurality of time intervals includes time intervals of 2 days, 7 days, and 3 months.

16. The non-transitory computer-readable medium of claim 12, wherein programmatically analyzing the time-series data of the first plurality of monitoring metrics comprises determining monitoring metrics that are substantially constant or substantially monotone, and wherein determining that the second plurality of monitoring metrics is a predictive set comprises at least excluding the monitoring metrics that are substantially constant or substantially monotone from the second plurality of monitoring metrics.

17. The non-transitory computer-readable medium of claim 12, wherein programmatically analyzing the time-series data of the first plurality of monitoring metrics comprises calculating a plurality of pairwise correlation coefficients based on the time-series data of the first plurality of monitoring metrics, wherein determining that the second plurality of monitoring metrics is a predictive set comprises at least determining that a first pairwise correlation coefficient and a second pairwise correlation coefficient meet a threshold correlation coefficient, and wherein determining that the second plurality of monitoring metrics comprises at least excluding a monitoring metric that is associated with a lesser of the first pairwise correlation coefficient and the second pairwise correlation coefficient.

18. The non-transitory computer-readable medium of claim 17, wherein programmatically analyzing the time-series data of the first plurality of monitoring metrics further comprises applying a normalization to the time-series data of at least one monitoring metric of the first plurality of monitoring metrics.

19. The non-transitory computer-readable medium of claim 12, wherein the monitoring metrics include one or more of CPU utilization, latency, memory utilization, Disk I/O for an application.

20. The non-transitory computer-readable medium of claim 12, wherein the monitoring metrics include one or more of input metrics, secondary metrics, and value metrics.

* * * * *